March 15, 1938.　　　　　H. LINDNER　　　　　2,110,958
DRILLING MACHINE
Filed July 13, 1935　　　4 Sheets-Sheet 1
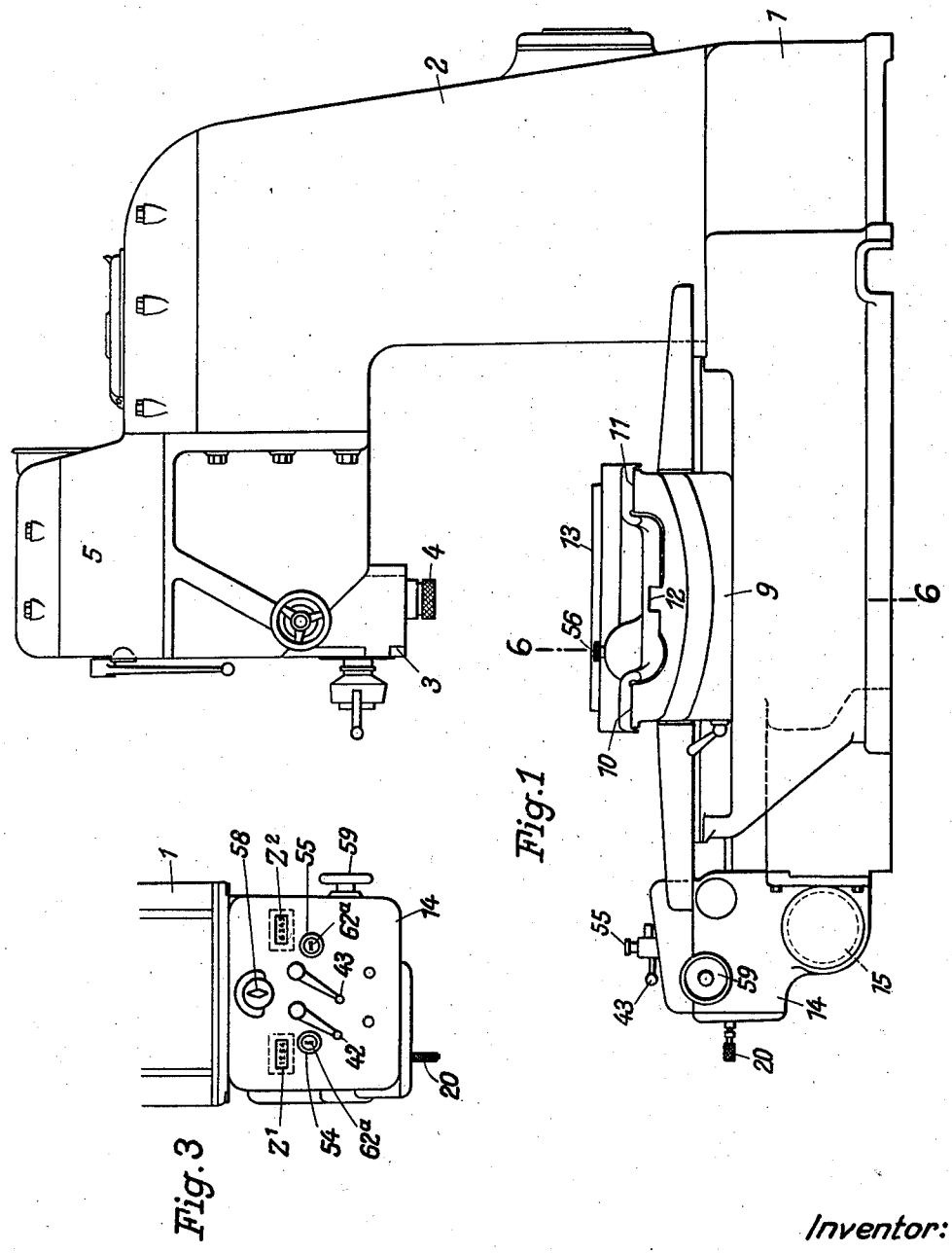
Inventor:
Herbert Lindner
By Thomas Appleman
Attorney

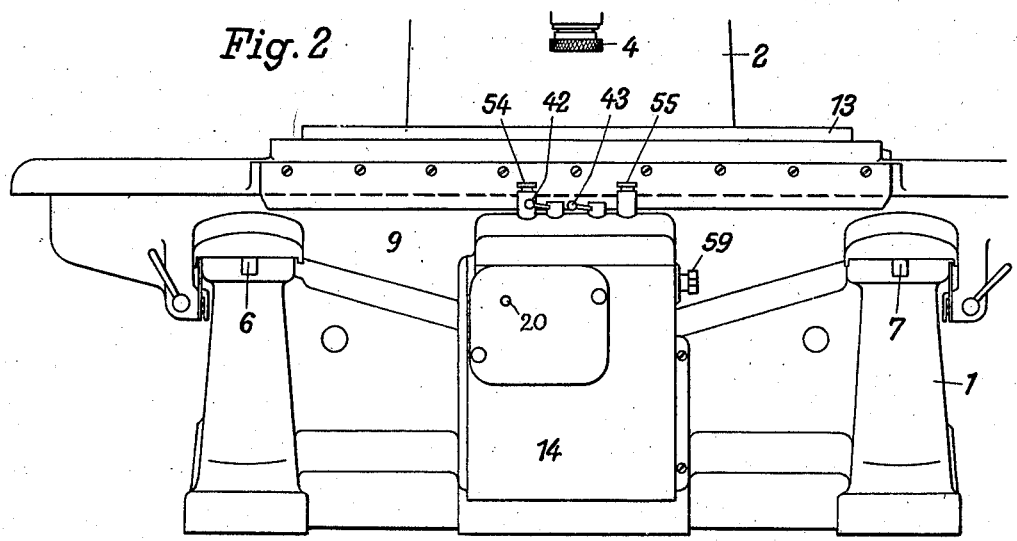
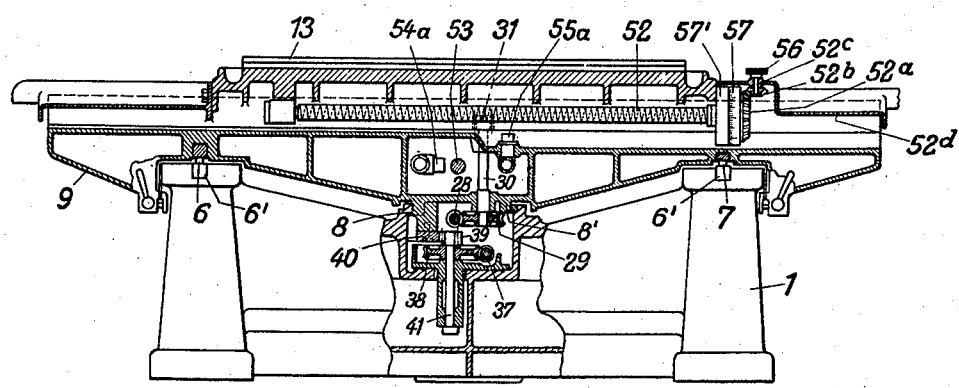

March 15, 1938.  H. LINDNER  2,110,958
DRILLING MACHINE
Filed July 13, 1935  4 Sheets-Sheet 3

Inventor:
Herbert Lindner

March 15, 1938.  H. LINDNER  2,110,958
DRILLING MACHINE
Filed July 13, 1935  4 Sheets-Sheet 4
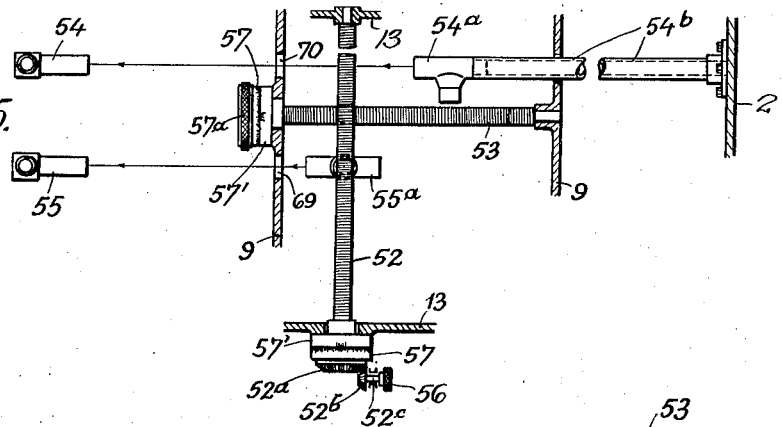
Fig. 5.
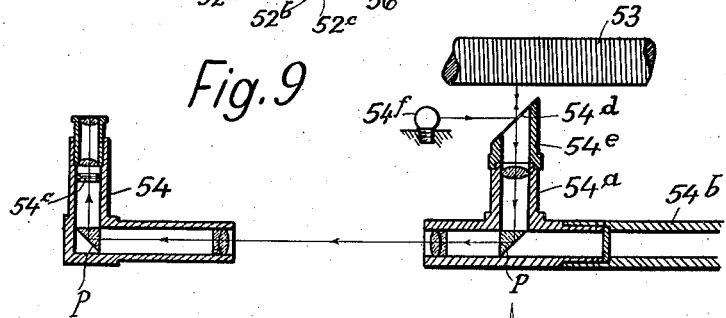
Fig. 9
Fig. 10
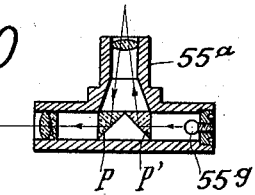
Fig. 11
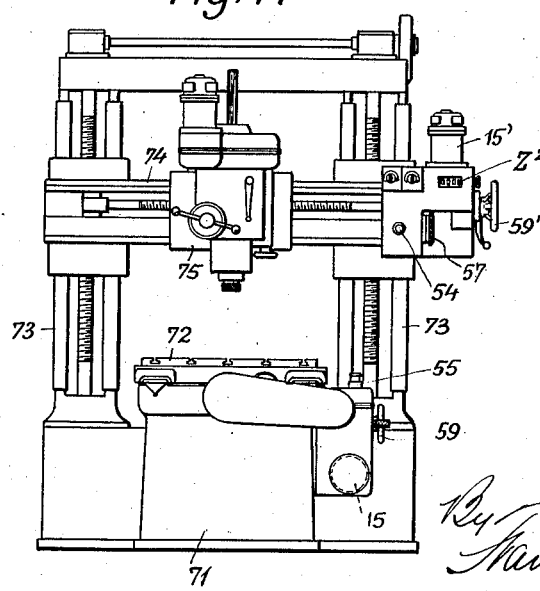
Inventor:
Herbert Lindner Patented Mar. 15, 1938

2,110,958

UNITED STATES PATENT OFFICE 2,110,958

DRILLING MACHINE

Herbert Lindner, Berlin-Wittenau, Germany

Application July 13, 1935, Serial No. 31,266
In Germany July 17, 1934

14 Claims. (Cl. 77—63)

Setting the table of a machine drill when such table is mounted for movements in coordinate directions by means of microscopic observation of scales arranged to move with the table is a well known method of attaining accuracy in the resultant setting so that holes may be drilled at accurately determined points in the work. Such a method, however, involves much loss of time, since the setting of the table, no matter how great the distance it must be moved, is accomplished manually and is thus necessarily slow.

Other drilling machines have been constructed wherein the setting of the table is effected by feed screws arranged to move the table in its coordinate directions, such screws being hand-operated and provided with circularly graduated heads associated with verniers. Such adjusting screws and their nuts are subject to wear with the consequence that back-lash develops in the adjusting devices after a certain amount of service. This type of machine is thus not only slow, since the screws are manually operated, but is apt to be inaccurate in the settings. Even if the screws be arranged for clutch connection to servo-motors to speed up the adjustment, the factor of inaccuracy still persists and the machines are thus unsuitable for fine work.

A still further form of machine drill embodies a table wherein the coordinate movements are electrically effected by servo-motors, the bed supporting the table being provided for each coordinate direction with a scale and vernier on which is mounted an adjusting stop and a coacting stop being arranged on the table and means being provided such that contact of coacting stops effects release from the action of the respective motor. However, the time required to effect such release as well as the inertia of the moving table prevents accuracy of adjustment, even though the setting of the first mentioned stop be accomplished under a magnifier.

One important object of the present invention is to provide an improved means for adjusting the table or tool slide of a machine drill having all the advantages and none of the defects inherent in the machines above described.

A second important object of this invention is to provide improved means for adjusting the table or tool slide of a machine drill, which means include power driving means for quickly adjusting the table approximately to its desired position.

A third important object of this invention is to provide a novel arrangement of scale and scale-observing microscopes for enabling accurate adjustment of the table or tool slide to be attained.

A fourth important object of this invention is to provide auxiliary manually operated means adapted to be operated to obtain accurate adjustment of the table or tool slide after approximate position has been obtained by the power-driven means.

With the foregoing and other objects in view, the invention consists in the details of construction and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 is a side elevation of a machine drill constructed in accordance with this invention;

Figure 2 is a front elevation of the lower part of such a machine drill;

Figure 3 illustrates a plan view of the front part of the invention;

Figure 5 illustrates a schematic view of the optical arrangement for such a machine drill;

Figure 6 illustrates a section on the line 6—6 of Figure 1;

Figure 9 illustrates a detail view showing in section one form of microscopic apparatus for observing the scales used;

Figure 10 illustrates a view similar to Figure 9 and showing a second form of such microscopic device; and Figure 11 is a front elevation of another type of coordinate or jig boring machine constructed in accordance with the invention.

Figure 4:
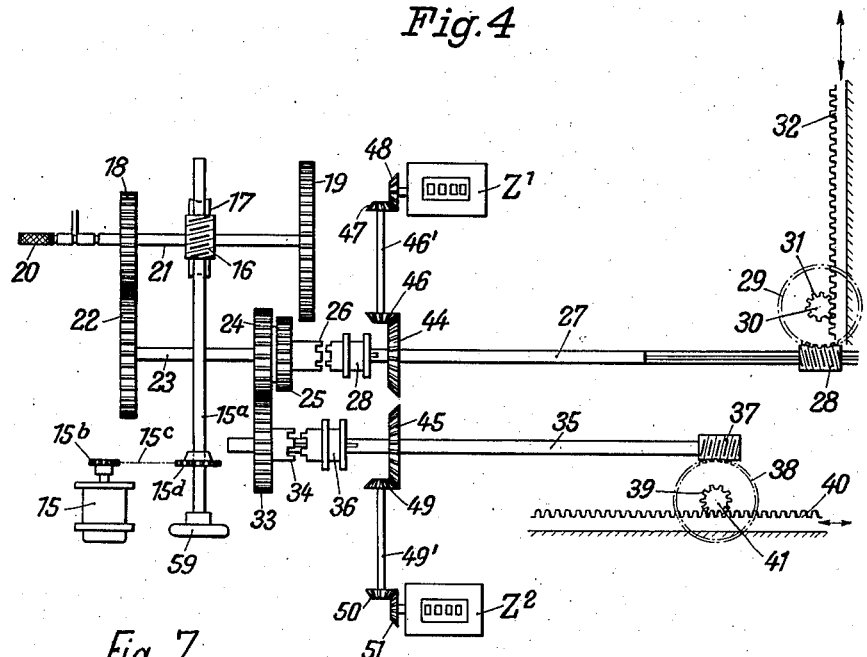
Figure 4 illustrates a diagrammatic view of the bed-adjusting means including its gearing.

In the embodiment of the invention illustrated in the accompanying drawings Figs. 1–6, there is provided a hollow bed 1 from the rear central portion of which rises a hollow standard 2 extending forwardly to support a vertically adjustable head 3 carrying the drill spindle. The drill spindle is rotated by a motor (not shown) through gearing (not shown) contained in the gear casing 5. The motor and gearing just mentioned form no part of the present invention and it is for this reason that they are not shown, the spindle drive being of any well known or desired form.

The sub-table 9 is supported for movement longitudinally of the machine by rollers 6 and 7 on shears or ways 7' and is provided centrally with a pair of spaced ribs laterally engaging the proximal sides of guides 8 formed on the middle part of the bed 1. On top of the sub-table 9 is a pair of shears or ways 10 and 11 between which is a rib 12. The bed proper 13 is supported on and guided by the parts 10, 11 and 12 just as the sub-table is supported on the base, but the table moves laterally of the sub-table. Obviously, movement of the sub-table correspondingly moves the table toward the front or rear of the machine, while the movement of the table on the sub-table effects lateral movement of such table relative to the bed. Thus, the table is mounted for movement in two coordinate directions beneath the drill spindle, the axis of which is in fixed position.

A casing 14 is mounted on the front of the bed substantially at its center, thus being in position for easy access by the operator of the machine. Power driving means, such as a servo-motor, one end of which is shown at 15 in Figure 1, is carried by the casing 14. Mounted on the shaft of this motor is a chain gear 15$^b$ driving a chain gear 15$^d$ fixed on the shaft 15$^a$ by means of a chain 15$^c$. The shaft 15$^a$ extends through the casing 14 and has on its outer end a hand wheel 59. Further fixed on the shaft 15$^a$ is a worm 16 which meshes with a worm gear 17 splined on a shaft 21 extending longitudinally of the casing and projecting through its front. The front end of this shaft is provided with an operating handle whereby it may be longitudinally moved, the shaft 21 being slidably mounted in the casing. Fixed on the shaft 21 is a relatively small gear 18 and a relatively large gear 19. The small gear 18 is arranged to mesh with a gear 22 fixed on a shaft extending through the casing. On the shaft 23 is also fixed a gear 25 wherewith the gear 19 meshes when the shaft 21 is moved forwardly to disengage the gear 18 from the gear 22. Thus, the gears 18, 19, 22 and 25 form a change-speed gearing. The gear 25 carries a clutch member 26. Alined with the shaft 23 is a shaft 27 which extends longitudinally of the bed and has splined thereon a clutch member 28 movable into and out of engagement with the clutch member 26 so that the shaft 27 may be made to revolve in unison with the shaft 23. On the shaft 27 is splined a worm 28 which meshes with a worm wheel 29 fixed on a vertical shaft 30. A gear 31 is fixed on the upper end of the shaft 30 and meshes with a rack 32 fixed transversely to the under side of the table 13. It may now be seen that revolution of the shaft 27 will cause lateral movement of the table, the splining of the worm 28 on its shaft 27 permitting this in any position of the sub-table 9. On the shaft 23 is also fixed a gear 24 meshing with a gear 33 rotatably mounted on a shaft 35 extending longitudinally of the bed 1 and into the casing 14. The gear 33 is provided with a clutch member 34 adapted for engagement and disengagement by a clutch member 36 splined on the shaft 35. By this means, the shaft 35 may, whenever desired, be driven from the shaft 23.

Fixed on the shaft 35 is a worm 37 which meshes with a gear 38 fixed on a vertical shaft 41. The shaft 41 has a gear 39 fixed to its upper end and this gear meshes with a rack 40 fixed to the under side of the sub-table 9 to extend longitudinally of the bed 1. By this means the sub-table, and consequently the table, may be adjusted longitudinally of the bed.

On the top of the casing 14 is provided a pair of operating handles 42 and 43 which are suitably connected to the respective clutch members 28 and 36 so that by manipulation of these handles, the clutches may be engaged and disengaged.

Also on top of the casing, ports are provided through which may be observed measuring devices $Z^1$ and $Z^2$ of the type embodying a series of disks, each bearing the digits 0 to 9. On the shaft 27 is fixed a bevel gear 44 which meshes with a bevel gear 46 fixed on a shaft 46'. On the shaft 46' is fixed a bevel gear 47 which meshes with a bevel gear 48 mounted on the shaft of the measuring device $Z^1$. Similarly, on the shaft 35 is fixed a bevel gear 45 meshing with a beveled gear 49 fixed on a shaft 49' carrying a second bevel gear 50 meshing with a bevel gear 51 fixed on the shaft of the device $Z^2$. The two gear trains just described are so proportioned that for each unit of space traversed by the table or sub-table, such unit is indicated by the respective measuring device $Z^1$ or $Z^2$.

Beneath the bed is mounted a revoluble scale 52 having the scale divisions arranged spirally thereon. In the form shown in Figures 1 to 6, an edge graduated disk 57 is fixed adjacent one end of the scale 52 and adjacent this disk, is a fixed disk 57' bearing on its edge, vernier graduations. The disk 57 carries a bevel gear 52$^a$ which meshes with a bevel gear 52$^b$ fixed on a short shaft 52$^c$ which extends through a housing 52$^d$ carried by the sub-table. On the upper end of the shaft 52$^c$ is a manipulating knob 56. Similarly, a revoluble scale 53 is provided for the sub-table, the operating means for which may be identical with that of the scale 52, or as shown in Figure 5 the graduated disk 57 is provided with a knurled head 57$^a$ for rotating the scale 53. For the scale 52 there is provided a microscope having an eye-piece 55 projecting above the casing and an object-piece 55$^a$ fixed in the sub-table 9 adjacent the scale 52. Similarly, for the scale 53 is a microscope having an eye-piece 54 and an object-piece 54$^a$ mounted on a tube 54$^b$ which is fixed on the lower portion of the front of the standard 2. In each microscope arrangement the light rays traverse the open space between object-piece and eye-piece passing a hole 69, (70) in the front wall of the sub-table 9.

In Figures 9 and 10 are shown certain microscope arrangements for use herewith. In each of these figures, reflecting prisms $p$ are used to direct the light rays, indicated by arrows, through the lenses of the lens systems. In Figure 9, the object-end of the microscope is provided with a semi-transparent mirror 54$^d$ mounted on a tube 54$^e$. A lamp 54$^f$ provides light which is reflected from this mirror onto the scale 53 and the light passes back through the mirror to the eye-piece 54. In the form shown in Figure 10, a lamp 55$^g$ is mounted in the microscope tube and light from this lamp is reflected by the prism $p'$ onto the scale 52, the light being reflected from the scale back through the objective of the microscope to the eye-piece.

Figure 7:
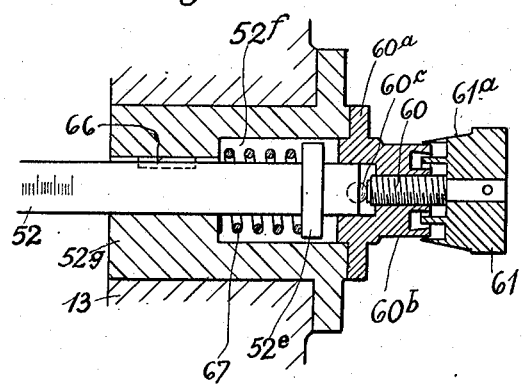
Figure 7 illustrates an enlarged longitudinal section showing a modified form of manual adjusting means used herewith.

A modification of the adjusting device for fine measurements is shown in Figure 7 wherein the scale 52 passes through a sleeve 52$^g$ having a chamber 52$^f$. A collar 52$^e$ is provided on the sleeve in this chamber and between this collar and the bottom of the chamber there is provided a spring 67 which urges the collar away from the bottom and consequently urges the scale in the same direction. The mouth of the chamber is closed by a nut 60ª wherethrough is screwed a micrometer screw 60 having a head 61 fixed thereon. The head 61 has a skirt 61ª surrounding the graduated barrel 60ᵇ of the nut, the skirt 61 being provided with a graduated surface as is common in micrometers. A ball bearing 60ᶜ is located between the scale 52 and screw 60. A key 66 is provided to prevent the scale from rotating.

Figure 8:
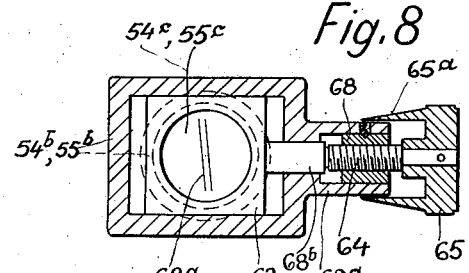
Figure 8 illustrates a view similar to Figure 7 but showing a second modification of the manual adjusting means.

In the form shown in Figure 8, there is provided a slide 63 guided to move transversely of the microscope tubes, and having a glass 55ᶜ, (54ᶜ) on which is ruled lines 62ª adapted to be brought into coincidence with the scale lines. A micrometer screw 64 is fitted in a nut 68 fixed in a barrel 68ª projecting from the microscope tube. This screw bears against a stem 68ᵇ projecting from the slide 63. A head 65 is fixed on the screw 64 and has a graduated skirt 65ª surrounding the barrel which is also graduated. In each of these forms, the micrometer is used in the ordinary manner to obtain the fine adjustment.

A snap switch 58 on top of the casing 14 controls the current for the servo-motor 15. A hand wheel 59 is fixed on the projecting end of the shaft 15ª.

In order to understand the manipulation of the machine, let it be supposed that the cylindrical scales are graduated in millimeters, the disks 51 each having 100 graduations and the vernier 9 graduations occupying the space of 10 of the disk graduations. Let it be also supposed that the microscopes are provided with suitable means to indicate the line of collimation. First, the table or sub-table, as the case may be, will be connected through its gearing to the shaft 15ª. Now, a division of the scale 52 or 53 respectively, is brought, by rotation of the knob 56, into coincidence with the line of collimation of its microscope and the reading on the proper measuring device Z¹ or Z² noted. The knob 56 is now turned until the scale on the disk and the vernier indicate the proper fractional parts of a millimeter desired. The switch 58 is now closed to bring the servo-motor into service, and the motor is allowed to operate until the respective measuring device Z¹ or Z² indicates that the desired adjustment has been approximately attained. The motor is now cut out and the hand wheel 59 operated until the required scale division for the whole number of millimeters is brought into the line of collimation of the microscope.

By this means, it is possible to readily attain an accuracy as close as 0.001 mm. and that with great rapidity. The invention may be employed in any type of coordinate or jig boring machine; for example, in a machine drill of the kind in which the tool spindle support is slidably mounted on a cross rail carried on two vertical uprights (planing machine type of housing), while the work table is slidable on the bed of the machine in a path at right angles to the path of movement of the tool spindle support. Such a machine is illustrated in Figure 11 as a schematic front elevation. The work-table 72 slides from the bed 71 on which rise the two vertical uprights or standards 73 carrying the cross-rail 74. Slidably mounted on the cross-rail 74 is the tool spindle support 75. Movement of the table 72 is effected by a servo-motor 15 or by the hand wheel 59. Similarly, for transverse movement of the tool spindle support a motor 15' and a hand wheel 59' are provided. Scales for measuring the displacement of these movable members, microscopic means for observing the scales, and measuring devices for approximately measuring the displacement of the said members are arranged in a similar manner as in the type of machine drill described before.

There has thus been provided a highly efficient device of the kind for the purposes specified.

It is obvious that changes may be made in the form and construction of the invention without departing from the material principles involved. It is not, therefore, desired to confine the invention to the exact form herein shown and described, but it is desired to include all forms which come within the scope of the appended claims.

I claim:

1. In a machine drill, a bed, a sub-table mounted on said bed for movement in a definite path, a table mounted on said sub-table for movement in a path at an angle to the path of movement of the sub-table, a servo-motor having a circuit including a switch, gearings driven from said servo-motor and arranged to move the sub-table and table along their paths upon operation of the motor, said gearings including clutch means for the sub-table and other clutch means for the table, said motor actuating a shaft for driving said gearings, a hand wheel on said shaft whereby the shaft may be rotated when the motor circuit is opened, measuring means for approximately indicating the movements of the table and sub-table, and gearings connecting said measuring means respectively with the gearing for the sub-table and the gearing for the table.

2. In a machine drill, a bed, a sub-table mounted on said bed for movement in a definite path, a table mounted on said sub-table for movement in a path at an angle to the path of movement of the sub-table, a servo-motor having a circuit including a switch, gearings driven from said servo-motor and arranged to move the sub-table and table along their paths upon operation of the motor, said gearings including clutch means for the sub-table and other clutch means for the table, said motor actuating a shaft for driving said gearings, a hand wheel on said shaft whereby the shaft may be rotated when the motor circuit is opened, measuring means for approximately indicating the movements of the table and sub-table, gearings connecting said measuring means respectively with the gearing for the sub-table and the gearing for the table, scales carried by said sub-table and table, said scales being mounted on the sub-table and table independently of the means for moving the table and sub-table and extending in their directions of movement, and microscopes arranged for observation of said scales.

3. In a machine drill, a bed, a sub-table mounted on said bed for movement in a definite path, a table mounted on said sub-table for movement in a path at an angle to the path of movement of the sub-table, a servo-motor having a circuit including a switch, gearings driven from said servo-motor and arranged to move the sub-table and table along their paths upon operation of the motor, said gearings including clutch means for the sub-table and other clutch means for the table, said motor actuating a shaft for driving said gearings, a hand wheel on said shaft whereby the shaft may be rotated when the motor circuit is opened, measuring means for approximately indicating the movements of the table and sub-table, gearings connecting said measuring means respectively with the gearing for the sub-table and the gearing for the table, scales carried by said sub-table and table, said scales being mounted on the sub-table and table independently of the means for moving the table and sub-table and extending in their directions of movement, microscopes arranged for observation of said scales, said scales being mounted for movement of adjustment on the sub-table and table respectively, and manually operable means for adjusting said scales.

4. In a machine drill, a bed, a sub-table mounted on said bed for movement in a definite path, a table mounted on said sub-table for movement in a path at an angle to the path of movement of the sub-table, a servo-motor having a circuit including a switch, gearings driven from said servo-motor and arranged to move the sub-table and table along their paths upon operation of the motor, said gearings including clutch means for the sub-table and other clutch means for the table, said motor actuating a shaft for driving said gearings, a hand wheel on said shaft whereby the shaft may be rotated when the motor circuit is opened, measuring means for approximately indicating the movements of the table and sub-table, gearings connecting said measuring means respectively with the gearing for the sub-table and the gearing for the table, scales carried by said sub-table and table, said scales being mounted on the sub-table and table independently of the means for moving the table and sub-table and extending in their directions of movement, microscopes arranged for observation of said scales, said scales being mounted for movement of adjustment on the sub-table and table respectively, and manually operable means for adjusting said scales, said last means including a graduated disk and a vernier scale for said disk.

5. In a machine drill, a bed, a sub-table mounted on said bed for movement in a definite path, a table mounted on said sub-table for movement in a path at an angle to the path of movement of the sub-table, a servo-motor having a circuit including a switch, gearings driven from said servo-motor and arranged to move the sub-table and table along their paths upon operation of the motor, said gearings including clutch means for the sub-table and other clutch means for the table, said motor actuating a shaft for driving said gearings, a hand wheel on said shaft whereby the shaft may be rotated when the motor circuit is opened, measuring means for approximately indicating the movements of the table and sub-table, gearings connecting said measuring means respectively with the gearing for the sub-table and the gearing for the table, scales carried by said sub-table and table, said scales being mounted on the sub-table and table independently of the means for moving the table and sub-table and extending in their directions of movement, microscopes arranged for observation of said scales, said scales each including a rotatable rod having graduations arranged spirally thereon, a graduated disk fixed to said rod, and manually operable means operatively connected to the disk to effect rotation of the disk and rod.

6. In a machine drill, a bed, a sub-table mounted on said bed for movement in a definite path, a table mounted on said sub-table for movement in a path at an angle to the path of movement of the sub-table, a servo-motor having a circuit including a switch, gearings driven from said servo-motor and arranged to move the sub-table and table along their paths upon operation of the motor, said gearings including clutch means for the sub-table and other clutch means for the table, said motor actuating a shaft for driving said gearings, a hand wheel on said shaft whereby the shaft may be rotated when the motor circuit is opened, measuring means for approximately indicating the movements of the table and sub-table, gearings connecting said measuring means respectively with the gearing for the sub-table and the gearing for the table, scales carried by said sub-table and table, said scales being mounted on the sub-table and table independently of the means for moving the table and sub-table and extending in their directions of movement, microscopes arranged for observation of said scales, said scales each including a rotatable rod having graduations arranged spirally thereon, a graduated disk fixed to said rod, manually operable means operatively connected to the disk to effect rotation of the disk and rod, and a vernier cooperating with the graduations of said disk.

7. In a machine drill, a bed, a sub-table mounted on said bed for movement in a definite path, a table mounted on said sub-table for movement in a path at an angle to the path of movement of the sub-table, a servo-motor having a circuit including a switch, gearings driven from said servo-motor and arranged to move the sub-table and table along their paths upon operation of the motor, said gearings including clutch means for the sub-table and other clutch means for the table, said motor actuating a shaft for driving said gearings, a hand wheel on said shaft whereby the shaft may be rotated when the motor circuit is opened, scales carried by said sub-table and table, said scales being mounted on the sub-table and table independently of the means for moving the table and sub-table and extending in their directions of movement, microscopes arranged for observation of said scales, controlling levers for said clutches, eye-pieces for said microscopes, and an operator's table, said controlling levers, switch and eye-pieces being located on said operator's table.

8. In a machine drill, a bed, a sub-table mounted on said bed for movement in a definite path, a table mounted on said sub-table for movement in a path at an angle to the path of movement of the sub-table, a servo-motor having a circuit including a switch, gearings driven from said servo-motor and arranged to move the sub-table and table along their paths upon operation of the motor, said gearings including clutch means for the sub-table and other clutch means for the table, said motor actuating a shaft for driving said gearings, a hand wheel on said shaft whereby the shaft may be rotated when the motor circuit is opened, measuring means for approximately indicating the movements of the table and sub-table, gearings connecting said measuring means respectively with the gearing for the sub-table and the gearing for the table, scales carried by said sub-table and table, said scales being mounted on the sub-table and table independently of the means for moving the table and sub-table and extending in their directions of movement, microscopes arranged for observation of said scales, controlling levers for said clutches, eye-pieces for said microscopes, and an operator's table, said controlling levers, switch and eye-pieces being located on said operator's table.

9. In a machine drill, a bed, a sub-table mounted on said bed for movement in a definite path, a table mounted on said sub-table for movement in a path at an angle to the path of movement of the sub-table, a servo-motor having a circuit including a switch, gearings driven from said servo-motor and arranged to move the sub-table and table along their paths upon operation of the motor, said gearings including clutch means for the sub-table and other clutch means for the table, said motor actuating a shaft for driving said gearings, a hand wheel on said shaft whereby the shaft may be rotated when the motor circuit is opened, measuring means for approximately indicating the movements of the table and sub-table, gearings connecting said measuring means respectively with the gearing for the sub-table and the gearing for the table, scales carried by said sub-table and table, said scales being mounted on the sub-table and table independently of the means for moving the table and sub-table and extending in their directions of movement, microscopes arranged for observation of said scales, controlling levers for said clutches, eye-pieces for said microscopes, and an operator's table, said controlling levers, switch and eye-pieces being located on said operator's table, said approximate measuring means being located beneath the operator's table and the operator's table having openings wherethrough the approximate measuring means may be observed.

10. In a machine drill of the type having a bed, a sub-table and a table and wherein the sub-table is guided on the bed to move in a rectilinear path and the table is guided on the sub-table to move in a rectilinear path at right angles to the path of the sub-table, said machine drill having means for moving said sub-table and table along their paths including an operator's stand, a servo-motor, a circuit for said motor including a switch located at said operator's stand, gearings connecting said motor with said sub-table and table and driving said sub-table and table, each of said gearings including a clutch, means for selectively operating said clutches and including operating handles mounted on said stand, a pair of rotary mechanical measurement indicators mounted on said stand and exposed for visual observation, and gearings connecting the indicators with the first mentioned gearings between the clutches and the sub-table and table.

11. In a machine drill of the type having a bed, a sub-table and a table and wherein the sub-table is guided on the bed to move in a rectilinear path and the table is guided on the sub-table to move in a rectilinear path at right angles to the path of the sub-table, said machine drill having means for moving said sub-table and table along their paths including an operator's stand, a servo-motor, a circuit for said motor including a switch located at said operator's stand, gearings connecting said motor with said sub-table and table and driving said sub-table and table, each of said gearings including a clutch, means for selectively operating said clutches and including operating handles mounted on said stand, scales carried by said sub-table and table, microscopic means for observing each scale and having an eye piece mounted on said stand, a pair of rotary mechanical measurement indicators mounted on said stand and exposed for visual observation, and gearings connecting the indicators with the first mentioned gearings between the clutches and the sub-table and table.

12. In a machine drill of the type having a bed, a sub-table and a table and wherein the sub-table is guided on the bed to move in a rectilinear path and the table is guided on the sub-table to move in a rectilinear path at right angles to the path of the sub-table, said machine drill having means for moving said sub-table and table along their paths including an operator's stand, a servo-motor, a circuit for said motor including a switch located at said operator's stand, gearings connecting said motor with said sub-table and table and driving said sub-table and table, each of said gearings including a clutch, means for selectively operating said clutches and including operating handles mounted on said stand, scales carried by said sub-table and table, microscopic means for observing each scale and having an eye piece mounted on said stand, the gearings driving said sub-table and table including a main shaft driven by said motor, and a hand wheel on said main shaft.

13. In a machine drill of the type having a bed, a sub-table and a table and wherein the sub-table is guided on the bed to move in a rectilinear path and the table is guided on the sub-table to move in a rectilinear path at right angles to the path of the sub-table, said machine drill having means for moving said sub-table and table along their paths including an operator's stand, a servo-motor, a circuit for said motor including a switch located at said operator's stand, gearings connecting said motor with said sub-table and table and driving said sub-table and table, each of said gearings including a clutch, means for selectively operating said clutches and including operating handles mounted on said stand, a pair of rotary mechanical measurement indicators mounted on said stand and exposed for visual observation, gearings connecting the indicators with the first mentioned gearings between the clutches and the sub-table and table, the gearings driving said sub-table and table including a main shaft driven by said motor, and a hand wheel on said main shaft.

14. In a machine drill of the type having a bed, a sub-table and a table and wherein the sub-table is guided on the bed to move in a rectilinear path and the table is guided on the sub-table to move in a rectilinear path at right angles to the path of the sub-table, said machine drill having means for moving said sub-table and table along their paths including an operator's stand, a servo-motor, a circuit for said motor including a switch located at said operator's stand, gearings connecting said motor with said sub-table and table and driving said sub-table and table, each of said gearings including a clutch, means for selectively operating said clutches and including operating handles mounted on said stand, scales carried by said sub-table and table, microscopic means for observing each scale and having an eye piece mounted on said stand, a pair of rotary mechanical measurement indicators mounted on said stand and exposed for visual observation, gearings connecting the indicators with the first mentioned gearings between the clutches and the sub-table and table, the gearings driving said sub-table and table including a main shaft driven by said motor, and a hand wheel on said main shaft.

HERBERT LINDNER.